United States Patent
Young

(10) Patent No.: US 10,960,982 B2
(45) Date of Patent: Mar. 30, 2021

(54) MODULAR FAUCET SYSTEM FOR AIRCRAFT

(71) Applicant: The Boeing Company, Chicago, IL (US)

(72) Inventor: Stephen M. Young, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/172,247

(22) Filed: Oct. 26, 2018

(65) Prior Publication Data

US 2020/0130841 A1    Apr. 30, 2020

(51) Int. Cl.
| | |
|---|---|
| *B64D 11/02* | (2006.01) |
| *E03C 1/042* | (2006.01) |
| *E03C 1/05* | (2006.01) |
| *E03C 1/04* | (2006.01) |
| *F16K 21/00* | (2006.01) |

(52) U.S. Cl.
CPC .............. *B64D 11/02* (2013.01); *E03C 1/042* (2013.01); *E03C 1/057* (2013.01); *E03C 1/0407* (2013.01); *F16K 21/00* (2013.01)

(58) Field of Classification Search
CPC .................................................... E03C 1/0407
USPC ............................................. 4/678, 675, 567
See application file for complete search history.

(56) References Cited

U.S. PATENT DOCUMENTS 5,504,950 A    4/1996    Natalizia et al.

FOREIGN PATENT DOCUMENTS

DE    8414722 U1    10/1984

OTHER PUBLICATIONS

Extended European Search Report, dated Mar. 19, 2020, regarding Application No. 19205422.9, 7 pages.

*Primary Examiner* — Lori L Baker
(74) *Attorney, Agent, or Firm* — Yee & Associates, P.C.

(57) ABSTRACT

A modular faucet system for an aircraft comprising a faucet outlet, a flow valve, and an actuator. The faucet outlet is configured to be installed on the aircraft. The flow valve is configured to be installed on the aircraft separately from the faucet outlet, to be connected by a first water line to a water supply comprising a water tank on the aircraft, and to be connected by a second water line to the faucet outlet. The actuator is configured to be installed on the aircraft separately from the faucet outlet and the flow valve. The actuator comprises a touchless sensor that is configured to detect a user of the modular faucet system. The actuator is configured to generate a control signal to open the flow valve to provide water from the water supply to the faucet outlet in response to detection of the user by the touchless sensor.

20 Claims, 16 Drawing Sheets

MODULAR FAUCET SYSTEM FOR AIRCRAFT

CROSS-REFERENCE TO RELATED APPLICATION

The present application is related to U.S. patent application Ser. No. 16/172,327, entitled "Lavatory Monument for Aircraft," filed on even date herewith, the disclosure of which is incorporated by reference herein in its entirety.

BACKGROUND INFORMATION

1. Field

The present disclosure relates generally to components for aircraft and more particularly to water faucets for use in lavatories on aircraft.

2. Background

Aircraft are subject to strict regulatory compliance standards in nearly every country in the world. In the United States, the Federal Aviation Administration governs the standards for manufacturing, maintaining, and operating aircraft. Many aircraft standards are set forth in the Federal Aviation Regulations (FARs), which includes dozens of parts divided into tens of thousands of separate sections. In all, there are many thousands of pages of regulations that must be observed across the aircraft industry.

Part 21 of the FARs deals with certification procedures for products and parts. This part of the FARs interacts with other parts of the FARs, such as, but not limited to parts 23-39 (dealing with airworthiness standards for different types of aircraft), part 43 (maintenance), part 119 (certification of carriers), part 121 (operating requirements), part 125 (large passenger aircraft), and others.

Because of these extensive regulations, a technician or engineer cannot simply replace a part on an aircraft with a similar part that performs the same or similar functions and that is available in non-aircraft markets. New or replacement parts for aircraft must be pre-approved per regulations before the parts may be installed on an aircraft. Approval must be obtained from the Federal Aviation Administration (or other regulatory body in countries other than the United States) in order to use new or different parts on an aircraft.

For example, components used in aircraft lavatories, like any other parts of the aircraft, are subject to strict regulatory requirements. A faucet for use in a lavatory on an aircraft, for example, must satisfy such regulatory requirements before the faucet may be installed on the aircraft. For this reason, it is not possible simply to install any desired faucet in a lavatory on an aircraft.

The limitations resulting from the heavy regulation of aircraft components are not easily overcome. To date, no acceptable solution to this problem has been presented. Instead, air carriers and aircraft manufacturers have had to either accept limited options for aircraft components or bear the costs of testing and certification for new or modified components.

SUMMARY

The illustrative embodiments provide a modular faucet system for an aircraft. The modular faucet system includes a faucet outlet, a flow valve, and an actuator. The faucet outlet is configured to be installed on the aircraft. The flow valve is configured to be installed on the aircraft separately from the faucet outlet, to be connected by a first water line to a water supply, wherein the water supply comprises a water tank on the aircraft, and to be connected by a second water line to the faucet outlet. The actuator is configured to be installed on the aircraft separately from the faucet outlet and the flow valve. The actuator comprises a touchless sensor configured to detect a user of the modular faucet system. The actuator is configured to generate a control signal to open the flow valve to provide water from the water supply to the faucet outlet in response to detection of the user by the touchless sensor.

The illustrative embodiments also provide a method of installing a modular faucet system on an aircraft. A faucet outlet is installed on the aircraft. A flow valve is installed on the aircraft separately from installing the faucet outlet on the aircraft. The flow valve is connected to a water supply by a first water line. The water supply comprises a water tank on the aircraft. The flow valve is connected to the faucet outlet by a second water line. An actuator is installed on the aircraft separately from installing the faucet outlet and the flow valve on the aircraft. The actuator comprises a touchless sensor configured to detect a user of the modular faucet system. The actuator is configured to generate a control signal to open the flow valve to provide water from the water supply to the faucet outlet in response to detection of the user by the touchless sensor.

The illustrative embodiments also provide a method of removing and replacing a modular faucet system on an aircraft. One of a faucet outlet, a flow valve, and an actuator is removed from a lavatory on an aircraft without removing an other of the faucet outlet, flow valve, and actuator from the lavatory. The faucet outlet, flow valve, and actuator are separate components of a modular faucet system. The flow valve is connected to a water supply by a first water line. The water supply comprises a water tank on the aircraft. The flow valve is connected to the faucet outlet by a second water line. The actuator comprises a touchless sensor configured to detect a user of the modular faucet system and is configured to generate a control signal to open the flow valve to provide water from the water supply to the faucet outlet in response to detection of the user by the touchless sensor. The one of the faucet outlet, the flow valve, and the actuator removed from the lavatory is replaced without replacing an other of the faucet outlet, the flow valve, and the actuator.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
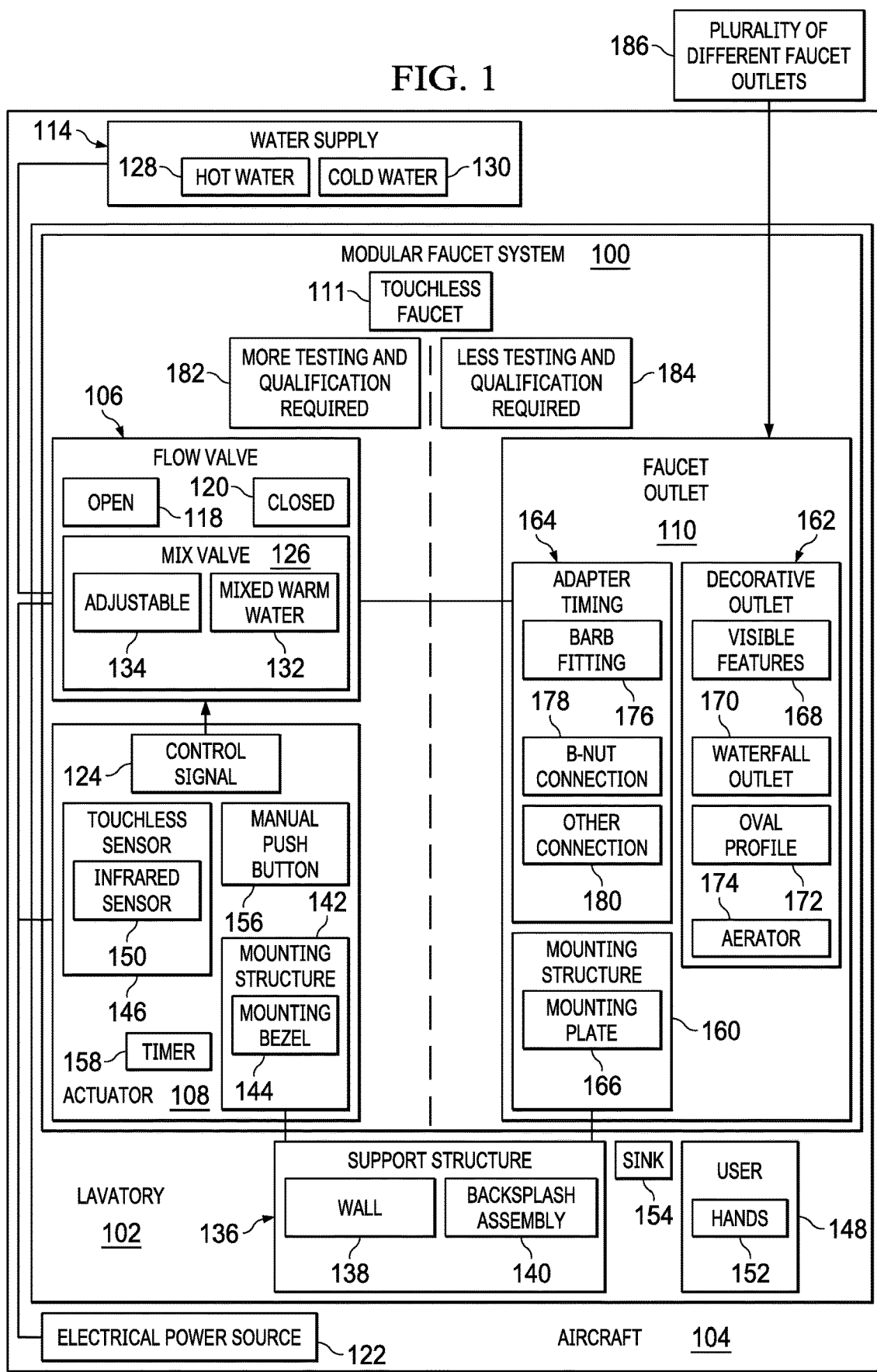
FIG. 1 is an illustration of a block diagram of a modular faucet system for an aircraft in accordance with an illustrative embodiment.

The different illustrative embodiments recognize and take into account a number of different considerations. For example, the illustrative embodiments recognize and take into account that, due to the heavy regulatory requirements for aircraft components, current options for aircraft lavatory fixtures may be limited. Furthermore, expanding the available options for aircraft lavatory fixtures may be time consuming and expensive, as each new or modified fixture is subject to testing and qualification to satisfy such regulatory requirements. As a result, improving available options and features in aircraft lavatory fixtures may be a slow and expensive process.

The illustrative embodiments also recognize and take into account that touchless fixtures may provide various desirable benefits. A touchless faucet is an example of such a touchless fixture.

A touchless faucet is a faucet equipped with a proximity sensor and mechanism that automatically opens a valve to allow water to flow in response to the presence of a hand or hands in close proximity. For example, without limitation, a touchless faucet may incorporate an active infrared sensor to detect hand motion. The faucet closes its valve again automatically after a few seconds or when it no longer detects the presence of hands. A touchless faucet also may be known as an automatic faucet, a hands-free faucet, an electronic faucet, a motion sensing faucet, a sensor faucet, or an infrared faucet.

Touchless faucets provide several advantages over conventional manually operated faucets. For example, touchless faucets have the advantage of shutting off automatically after hand washing, thereby reducing water waste. The automatic shutoff capability of touchless faucets also greatly reduces the risk of sink overflow due to a faucet being left on either inadvertently or deliberately. Touchless faucets also can benefit the elderly and those suffering from arthritis or other mobility limiting conditions, since there are no handles to twist or pull to operate the faucet. Other benefits of touchless faucets include inhibiting the spread of germs which are known to thrive on faucet handles, as well as helping to prevent or mitigate scalding incidents caused by hot water flowing out of a faucet.

Touchless fixtures have become a standard feature in many commercial restroom facilities. However, the use of touchless technology in aircraft lavatories has been relatively recent and limited. One difficulty with providing touchless fixtures for aircraft lavatories, in particular for faucets, is the high cost of qualification of the components. The high cost of qualification for a touchless faucet is due to the fact that there are a multitude of requirements for both the electrical components that allow the sensing operation to take place and the fluid system requirements that provide a reliable flow of water.

Aircraft operators and manufacturers would like to have an enhanced ability to customize lavatory interiors. Currently, however, a disconnect exists between the high cost of testing and qualification of a new faucet and the desire for rapid customization opportunities. For example, it may be desirable to have many available options for the decorative aspects of a faucet to be used in an aircraft lavatory or to be able to customize the decorative aspects of such a faucet for particular aircraft purchasers. However, currently, the decorative aspects of a touchless faucet for an aircraft lavatory are not easily updated because the decorative aspects are integrated along with the fluid and electrical system components of the faucet. As a result, the relatively extensive testing and qualification requirements for the fluid and electrical system components must be satisfied, even though only the decorative aspects of the faucet are changed. By themselves, the decorative aspects of the faucet may require much less extensive testing and certification than the fluid and electrical system components of the faucet.

In accordance with an illustrative embodiment, a greater range of customization opportunities for aircraft lavatory faucets is provided without involving extensive testing and qualification requirements. Illustrative embodiments accomplish this benefit by separating the decorative components of a touchless faucet from the electrical and fluid system components of the faucet. For example, in accordance with an illustrative embodiment, the touchless sensor, flow valve, and flow valve actuator of a touchless faucet are separated from the decorative faucet outlet. The separate decorative outlet component of the faucet does not include any sensitive electrical or fluid flow control system components, it is simply an outlet for water flow. Testing and qualification of different decorative outlets for a touchless faucet for an aircraft lavatory thus may be performed more timely and less expensively.

In accordance with an illustrative embodiment, the relatively complex electrical and fluid system components of a touchless faucet for an aircraft lavatory are basic and stable, while the faucet outlet can be more easily changed to meet customer needs. Illustrative embodiments support customers with increasing demand for customization and features for an aircraft lavatory. Illustrative embodiments provide additional feature selections for aircraft lavatory fixtures, which may allow customers to differentiate their brands and provide increased levels of service.

The different illustrative embodiments further recognize and take into account that touchless systems may require regular maintenance. For example, without limitation, a touchless faucet may be powered by batteries that may require regular replacement. Currently, such regular maintenance, or removal, replacement, or inspection of a touchless faucet for any other purpose, may be difficult because current touchless faucet systems are not modular.

In accordance with an illustrative embodiment, a touchless faucet is provided as a modular system comprising individual components that may be separately installed, maintained, removed, replaced, and inspected as needed. Furthermore, a touchless faucet in accordance with an illustrative embodiment may be installed as part of a modular lavatory monument on an aircraft. Therefore, a touchless faucet system for an aircraft may be more easily maintained, removed, replaced, or inspected. For example, components of a touchless faucet in accordance with an illustrative embodiment may be relatively easily accessed when the touchless faucet is installed in a modular lavatory monument on an aircraft by easily removing a modular backsplash in the modular lavatory monument.

Turning to FIG. 1, an illustration of a block diagram of a modular faucet system for an aircraft is depicted in accordance with an illustrative embodiment. Modular faucet system 100 may be installed in lavatory 102 on aircraft 104. For example, without limitation, modular faucet system 100 may be installed on aircraft 104 as part of the modular lavatory monument described in the above-referenced related U.S. patent application Ser. No. 16/172,327 (Boeing Docket No. 18-0453-US-NP). Alternatively, or in addition, modular faucet system 100 may be installed in any other appropriate location on aircraft 104, such as in a galley.

Aircraft 104 may be, for example, without limitation, a passenger aircraft, a cargo aircraft, a military aircraft, or any other appropriate type of aircraft for performing any appropriate mission or task. Aircraft 104 may be a fixed-wing aircraft, a rotary-wing aircraft, or a lighter-than-air aircraft.

Modular faucet system 100 may be used in vehicles other than aircraft 104. For example, without limitation, modular faucet system 100 may be used in any appropriate vehicle configured to travel on land, on water, under water or in any other medium or combination of media. Modular faucet system 100 also may be used in structures other than vehicles. For example, without limitation, modular faucet system 100 may be used in any appropriate fixed or mobile structure.

Modular faucet system 100 comprises flow valve 106, actuator 108, and faucet outlet 110. When installed in lavatory 102, or in another location on aircraft 104, the components of modular faucet system 100 form touchless faucet 111. The various advantages of touchless faucets as described above may be obtained on aircraft 104 using modular faucet system 100.

Flow valve 106 is implemented as a discrete assembly that is a separate component from actuator 108 and faucet outlet 110. Flow valve 106 may be installed on aircraft 104 separately from actuator 108 and faucet outlet 110. For example, flow valve 106 may be installed on aircraft 104 without installing actuator 108 and faucet outlet 110 on aircraft 104. Similarly, flow valve 106 may be removed from aircraft 104 without also removing actuator 108 and faucet outlet 110 from aircraft 104. Flow valve 106 may be attached to a different support structure on aircraft 104 from actuator 108 and faucet outlet 110 using separate mounting structures or methods. For example, flow valve 106 may be installed under a counter in lavatory 102.

Flow valve 106 may be implemented using any appropriate automatically operable valve. Flow valve 106 is configured to be connected by water line 112 to water supply 114 and by water line 116 to faucet outlet 110. For example, water supply 114 may be a water tank on aircraft 104. Water lines 112 and 116 may be implemented in any appropriate manner.

When flow valve 106 is open 118, water is allowed to flow from water supply 114 to faucet outlet 110. When flow valve 106 is closed 120, water is prevented from flowing to faucet outlet 110. Power for operation of flow valve 106 may be provided by any appropriate electrical power source 122. Operation of flow valve 106 is controlled by control signal 124 from actuator 108.

Flow valve 106 may include mix valve 126. Mix valve 126 may take hot water 128 and cold water 130 provided as input and provide mixed warm water 132 at a desired set temperature to faucet outlet 110. Mix valve 126 may be adjustable 134 such that manual temperature adjustments may be made via adjustment of a secondary mix valve by maintenance personnel or flight crew on aircraft 104.

Actuator 108 is implemented as a discrete component that is a separate component from flow valve 106 and faucet outlet 110. Actuator 108 may be installed on aircraft 104 separately from flow valve 106 and faucet outlet 110. For example, actuator 108 may be installed on aircraft 104 without installing flow valve 106 and faucet outlet 110 on aircraft 104. Similarly, actuator 108 may be removed from aircraft 104 without also removing flow valve 106 and faucet outlet 110 from aircraft 104. Actuator 108 may be attached to a different support structure on aircraft 104 from flow valve 106 and faucet outlet 110 using separate mounting structures or methods. For example, actuator 108 may be installed on appropriate support structure 136 near faucet outlet 110. For example, support structure 136 may be wall 138 or backsplash assembly 140 in lavatory 102. Actuator 108 may be provided with any appropriate mounting structure 142 for attaching actuator 108 to support structure 136. For example, mounting structure 142 may include mounting bezel 144.

Actuator 108 includes touchless sensor 146. Touchless sensor 146 may be any appropriate sensor configured to detect user 148 of modular faucet system 100. For example, touchless sensor 146 may be infrared sensor 150 or another appropriate sensor that detects hands 152 of user 148 in sink 154 below faucet outlet 110. Actuator 108 is configured to generate control signal 124 to open flow valve 106 in response to detecting user 148 of modular faucet system 100 by touchless sensor 146. Actuator 108 may be configured to generate control signal 124 to close flow valve 106 when user 148 of modular faucet system 100 is no longer detected by touchless sensor 146.

Actuator 108 may include manual push button 156 in addition to touchless sensor 146. Actuator 108 may be configured to generate control signal 124 to open flow valve 106 in response to actuation of manual push button 156 by user 148 of modular faucet system 100.

Actuator 108 may include timer 158. Actuator 108 may be configured to generate control signal 124 to close flow valve 106 after a set time period following the opening of flow valve 106 using timer 158. Power for operation of actuator 108 may be provided by any appropriate electrical power source 122.

Faucet outlet 110 is implemented as a discrete component that is a separate component from flow valve 106 and actuator 108. Faucet outlet 110 may be installed on aircraft 104 separately from flow valve 106 and actuator 108. For example, faucet outlet 110 may be installed on aircraft 104 without installing flow valve 106 and actuator 108 on aircraft 104. Similarly, faucet outlet 110 may be removed from aircraft 104 without also removing flow valve 106 and actuator 110 from aircraft 104. Faucet outlet 108 may be attached to a different support structure on aircraft 104 from flow valve 106 and actuator 110 using separate mounting structures or methods.

Faucet outlet 110 may include mounting structure 160, decorative outlet 162, and adaptor fitting 164. Mounting structure 160 may include any appropriate structure for attaching faucet outlet 110 to support structure 136. For example, mounting structure 160 may include mounting plate 166 attached to decorative outlet 162. Faucet outlet 110 may be attached to support structure 136 using appropriate fasteners extending through mounting holes in mounting plate 166 and into support structure 136. For example, without limitation, appropriate fasteners may be extended through mounting holes in mounting plate 166 into a back surface of support structure 136, thereby to secure faucet outlet 110 from a back side of support structure 136. Securing faucet outlet 110 to the back side of support structure 136 in this way makes it more difficult for unauthorized persons to remove or otherwise tamper with faucet outlet 110. It also may provide a cleaner look in that no screws or other fasteners are visible on the front side of support structure 136 through which decorative outlet 162 may extend.

Decorative outlet 162 may include any appropriate and desired visible features 168. Decorative outlet 162 may be implemented using any appropriate design or style. For example, without limitation, decorative outlet 162 may be waterfall outlet 170 or an outlet having oval profile 172. Decorative outlet may include aerator 174.

Adaptor fitting 164 is configured to provide a common interface between faucet outlet 110 and flow valve 106. Adaptor fitting 164 thus may be configured to provide fluid communication between water line 116 from flow valve 106 and decorative outlet 162. For example, adaptor fitting 164 may include barb fitting 176, B-nut connection 178, or any appropriate other connection 180. Adaptor fitting 164 may be configured to screw into the back of decorative outlet 162 or may be attached to decorative outlet 162 in any other appropriate manner.

Flow valve 106 and actuator 108 are active components of modular faucet system 100 that control the flow of water in lavatory 102 on aircraft 104. In contrast, faucet outlet 110 is a passive component of modular faucet system 100 that directs the flow of water in a particular direction that may not be changed during operation of modular faucet system 100. Safety and reliability may be of greater concern for flow valve 106 and actuator 108 than for faucet outlet 110. For example, a malfunction of flow valve 106 or actuator 108 may prevent stopping the flow of water through modular faucet system 100. This may result in water damage on aircraft 104, discomfort or inconvenience to passengers or crew on aircraft 104, or other undesirable conditions on aircraft 104. In contrast, a malfunction of faucet outlet 110 would not result in such undesirable conditions on aircraft 104.

Flow valve 106 and actuator 108 may be more complex than faucet outlet 110. For example, flow valve 106 and actuator 108 may have more components and perform more functions than faucet outlet 110. Therefore, testing of flow valve 106 and actuator 108 may be more complicated, time consuming, or expensive than testing of faucet outlet 110.

Because of the greater safety and reliability concerns associated with flow valve 106 and actuator 108 relative to faucet outlet 110, the greater complexity of flow valve 106 and actuator 108 relative to faucet outlet 110, or both, more testing and qualification may be required 182 for flow valve 106 and actuator 108 to be installed and used on aircraft 104 relative to faucet outlet 110. For example, flow valve 106 and actuator 108 that satisfy such testing and qualification requirements may be certified for installation and use on an aircraft. Such certification may not be required for faucet outlet 110. Because safety and reliability are of less concern for faucet outlet 110 than for actuator 108 and flow valve 106, the lesser complexity of faucet outlet 110 relative to flow valve 106 and actuator 108, or both, less testing and qualification may be required 184 for faucet outlet 110 to be installed and used on aircraft 104 relative to flow valve 106 and actuator 108.

Because faucet outlet 110 is a separate component from flow valve 106 and actuator 108, plurality of different faucet outlets 186 may be tested and qualified for use with flow valve 106 and actuator 108 on aircraft 104 at relatively little cost. Faucet outlet 110 to be installed on aircraft 104 then may be selected from plurality of different faucet outlets 186 that have been tested and qualified for installation and use on aircraft 104.

Figure 2:
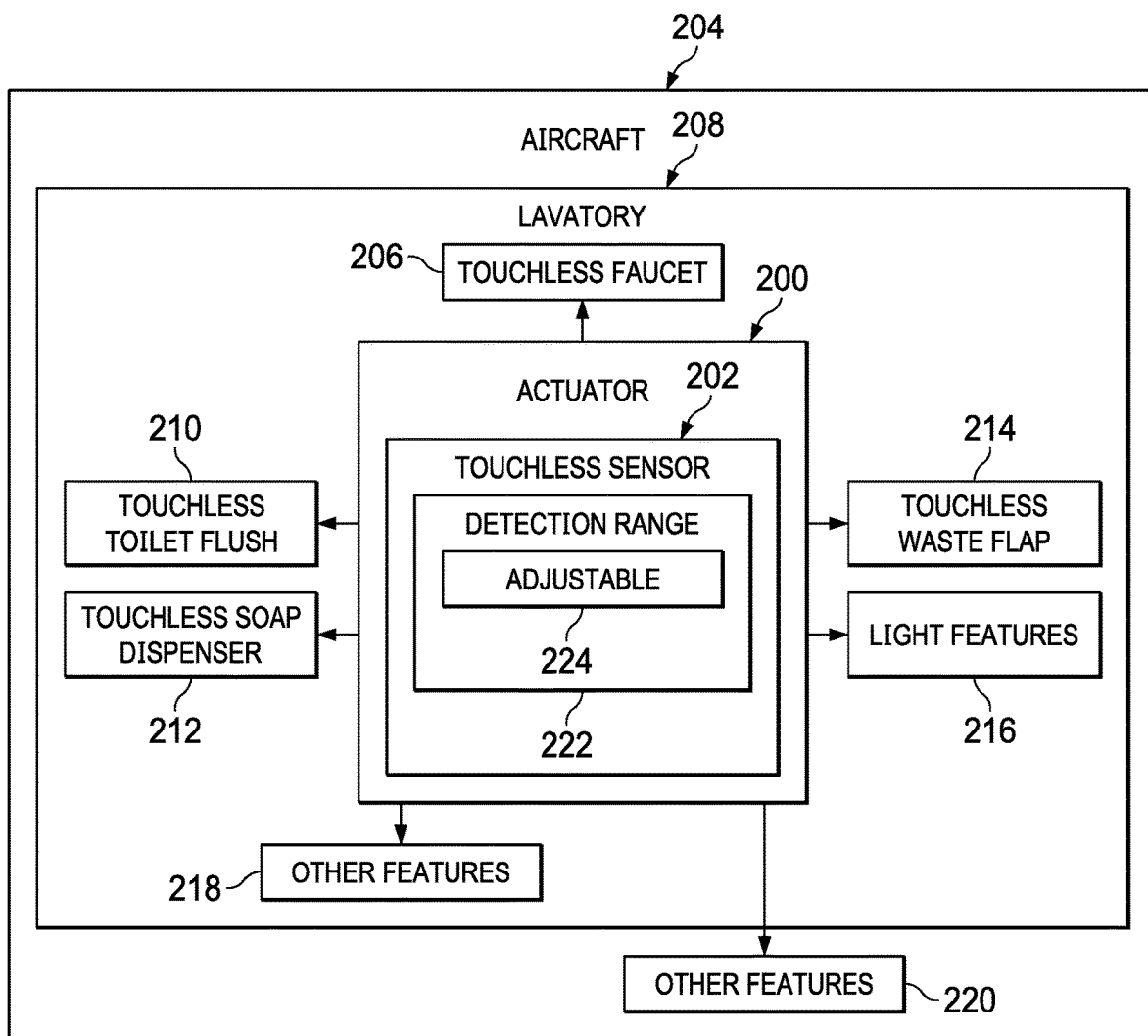
FIG. 2 is an illustration of a block diagram of usage of an actuator including a touchless sensor in multiple applications in accordance with an illustrative embodiment.
Figure 3:
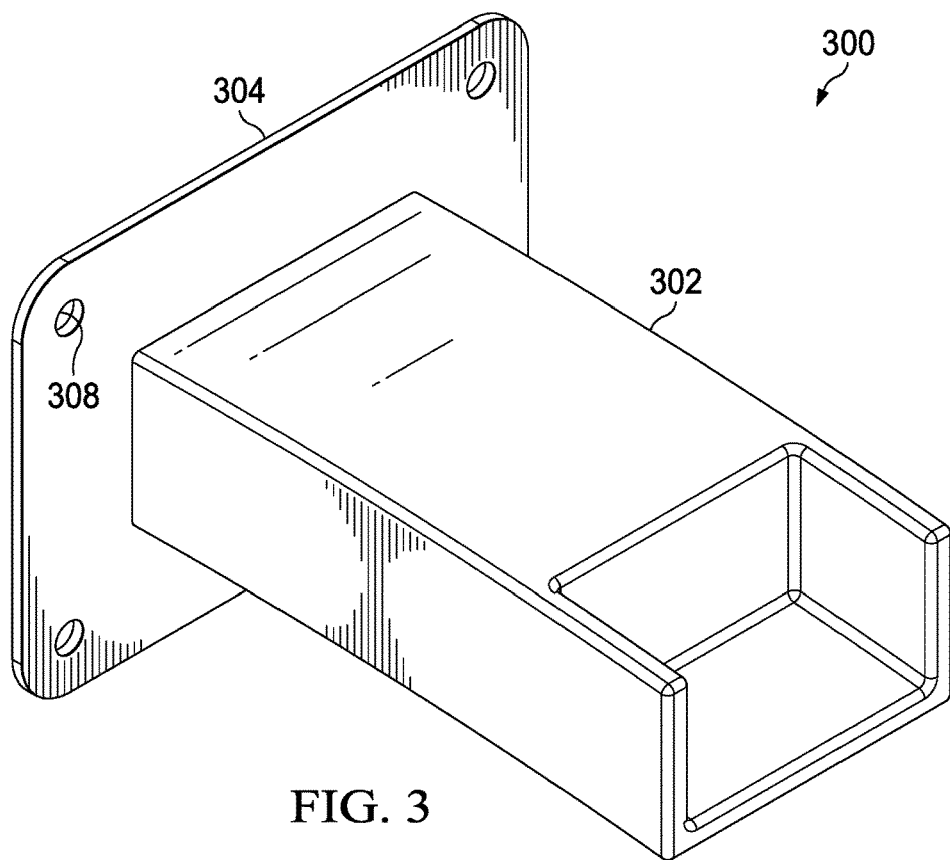
FIGS. 3-8 are illustrations of perspective views of a waterfall faucet outlet in accordance with an illustrative embodiment.
Figure 4:
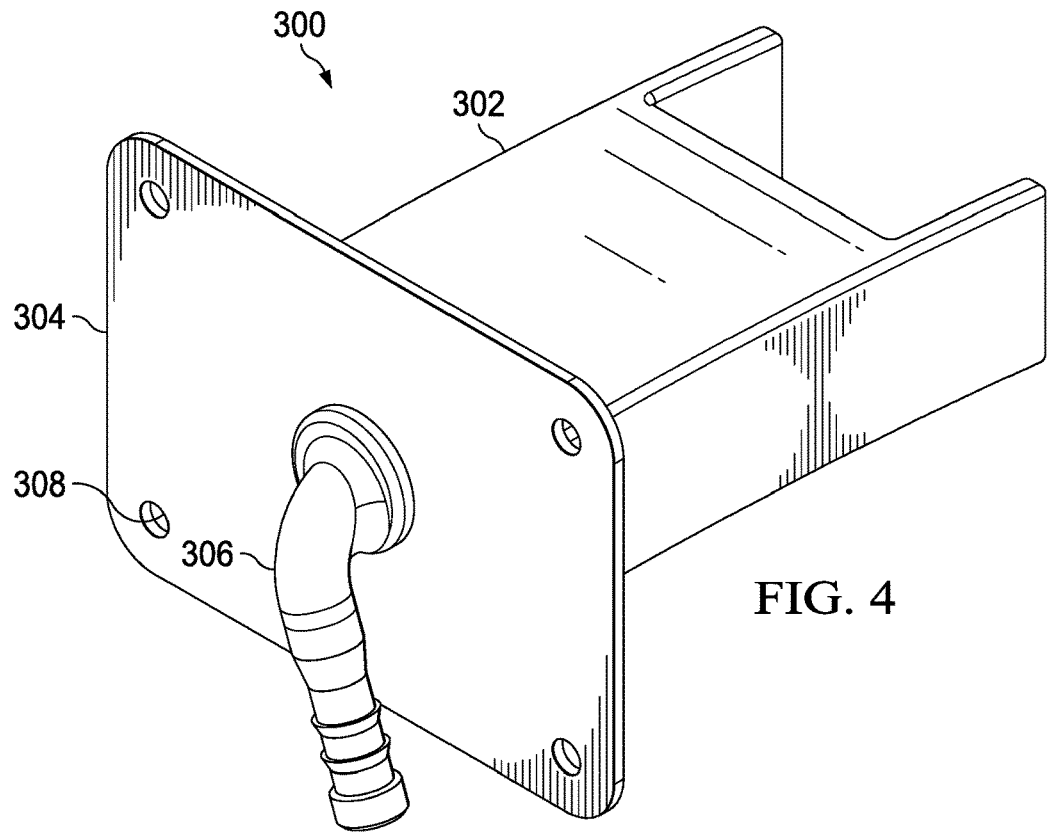
Figure 5:
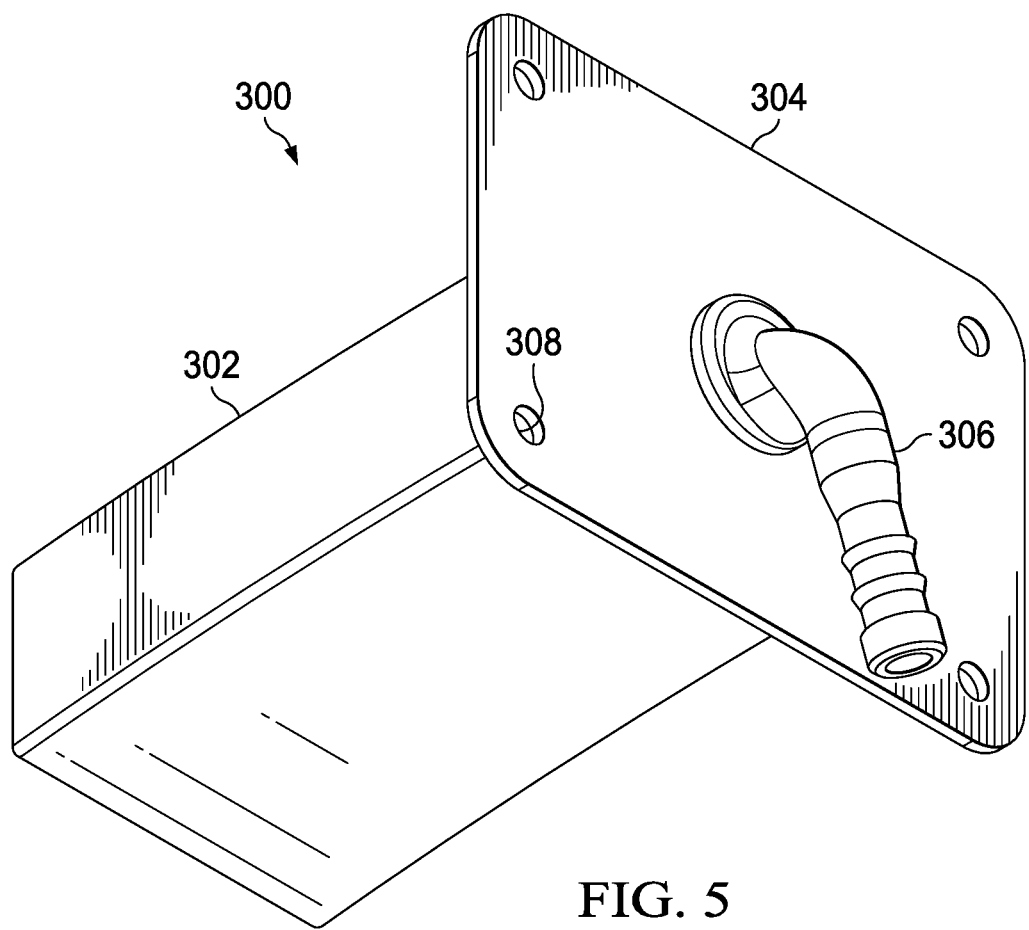
Figure 6:
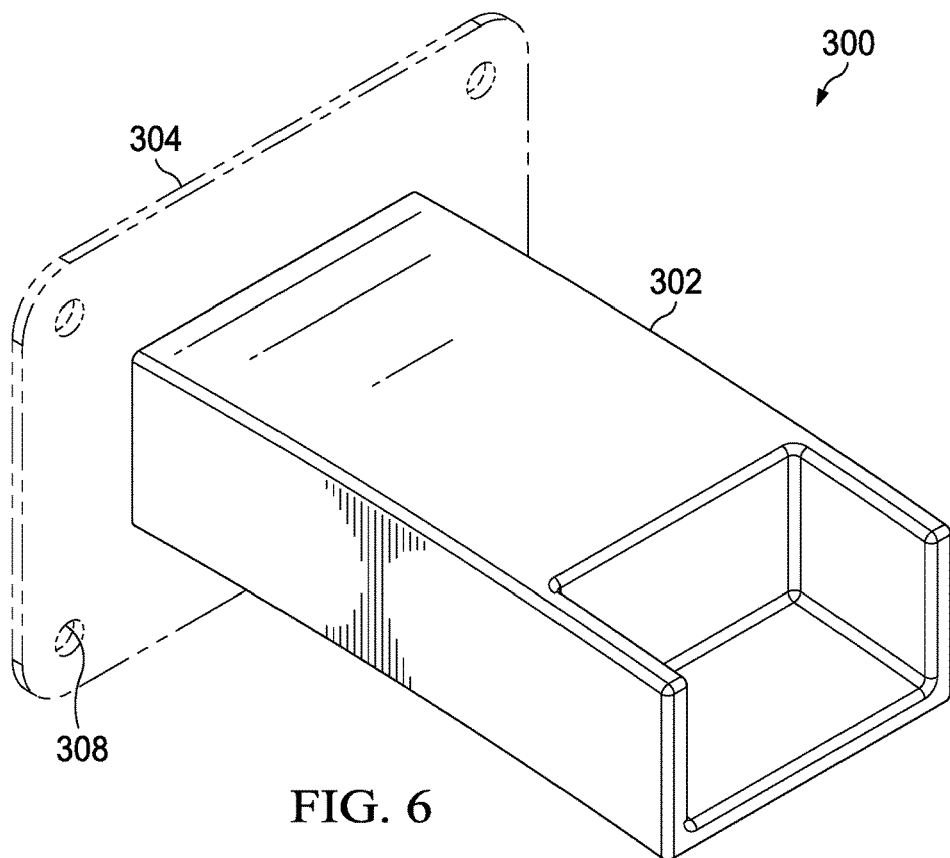
Figure 7:
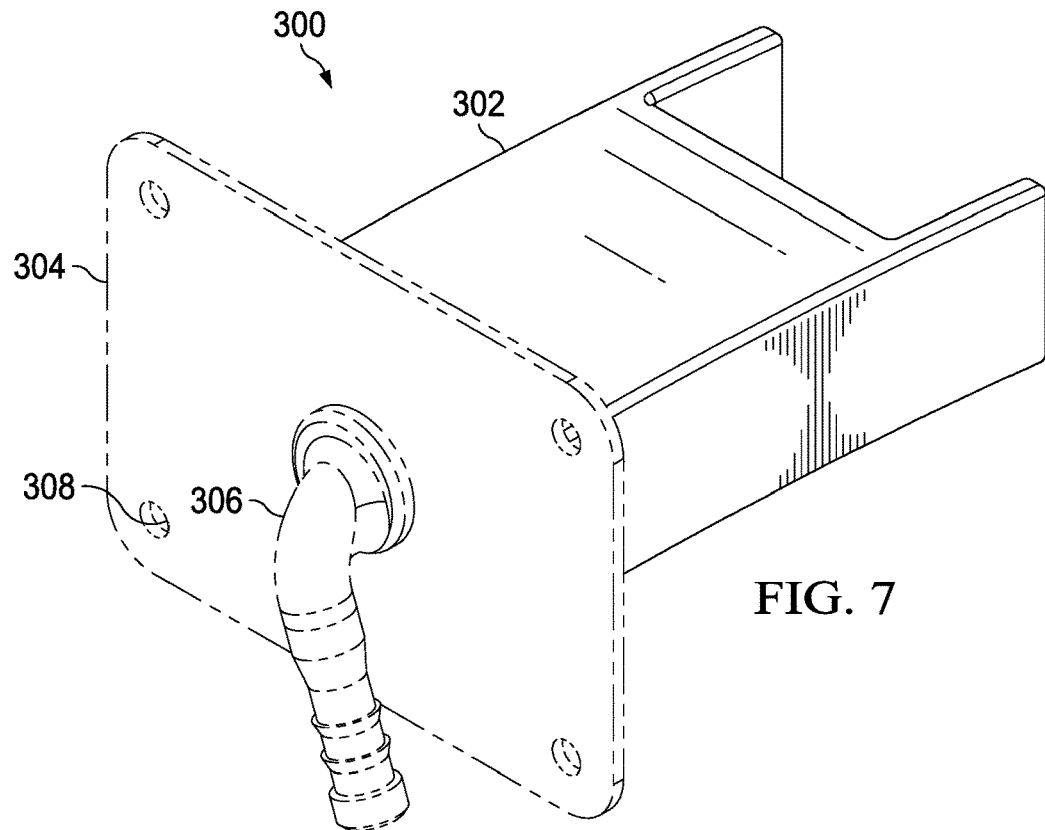
Figure 8:
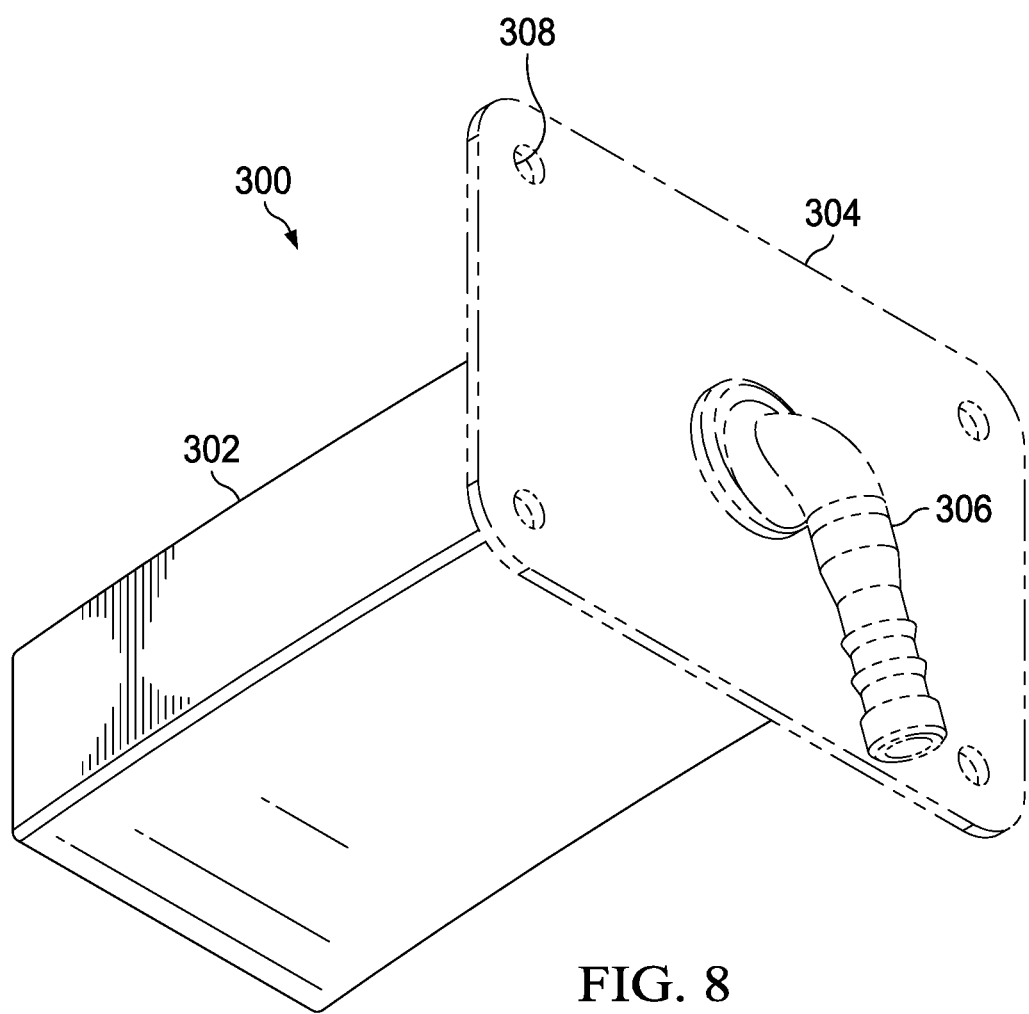
Figure 9:
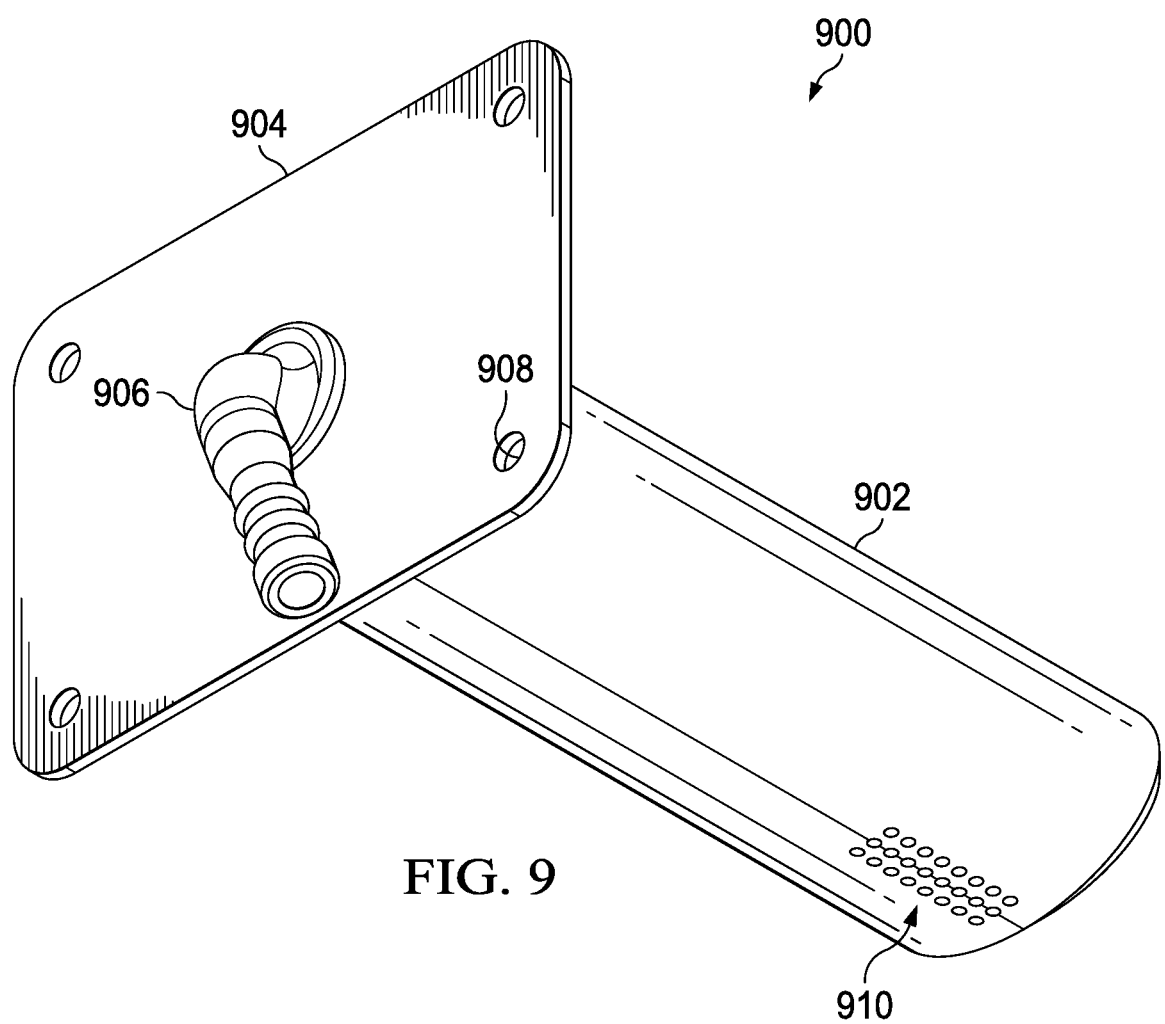
FIGS. 9-14 are illustrations of perspective views of a faucet outlet having an oval profile in accordance with an illustrative embodiment.
Figure 10:
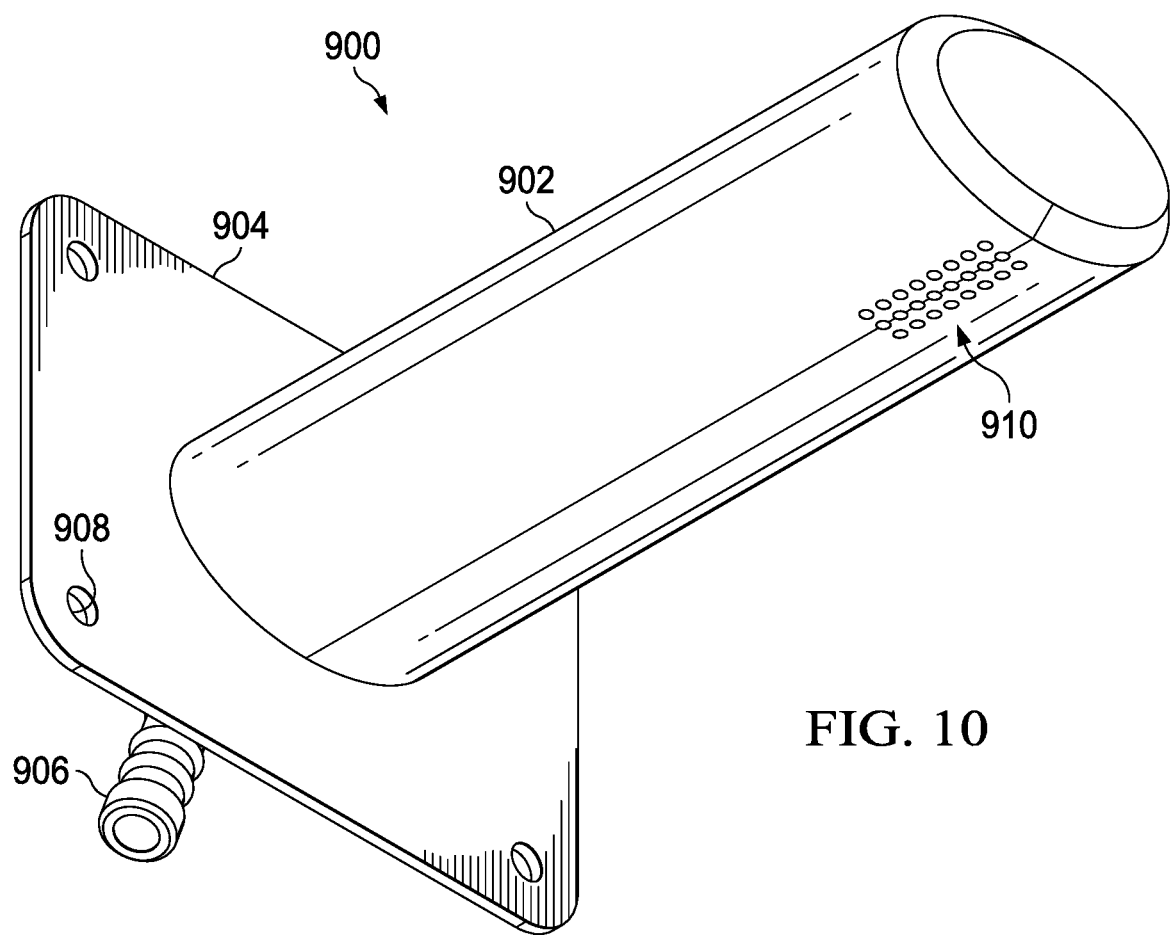
Figure 11:
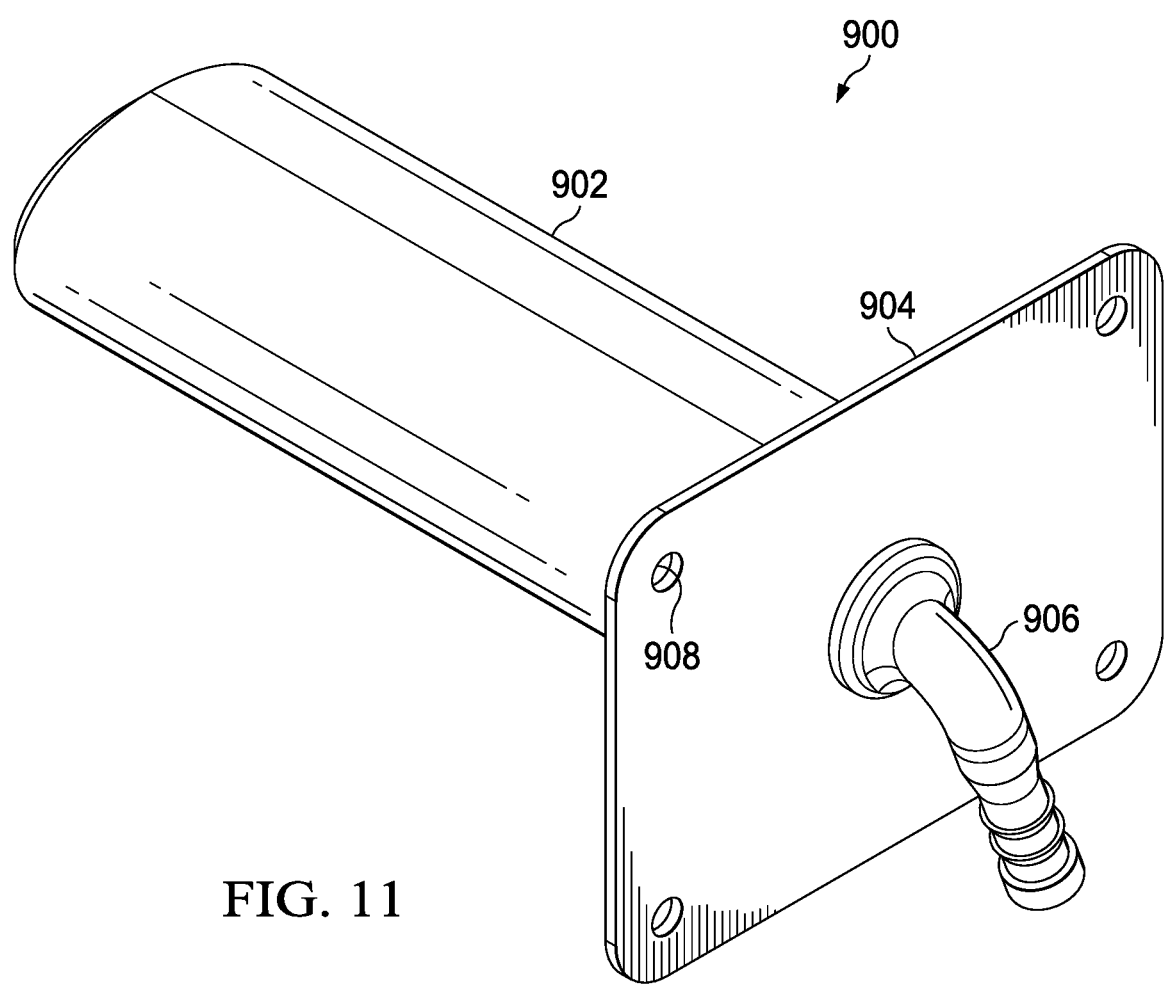
Figure 12:
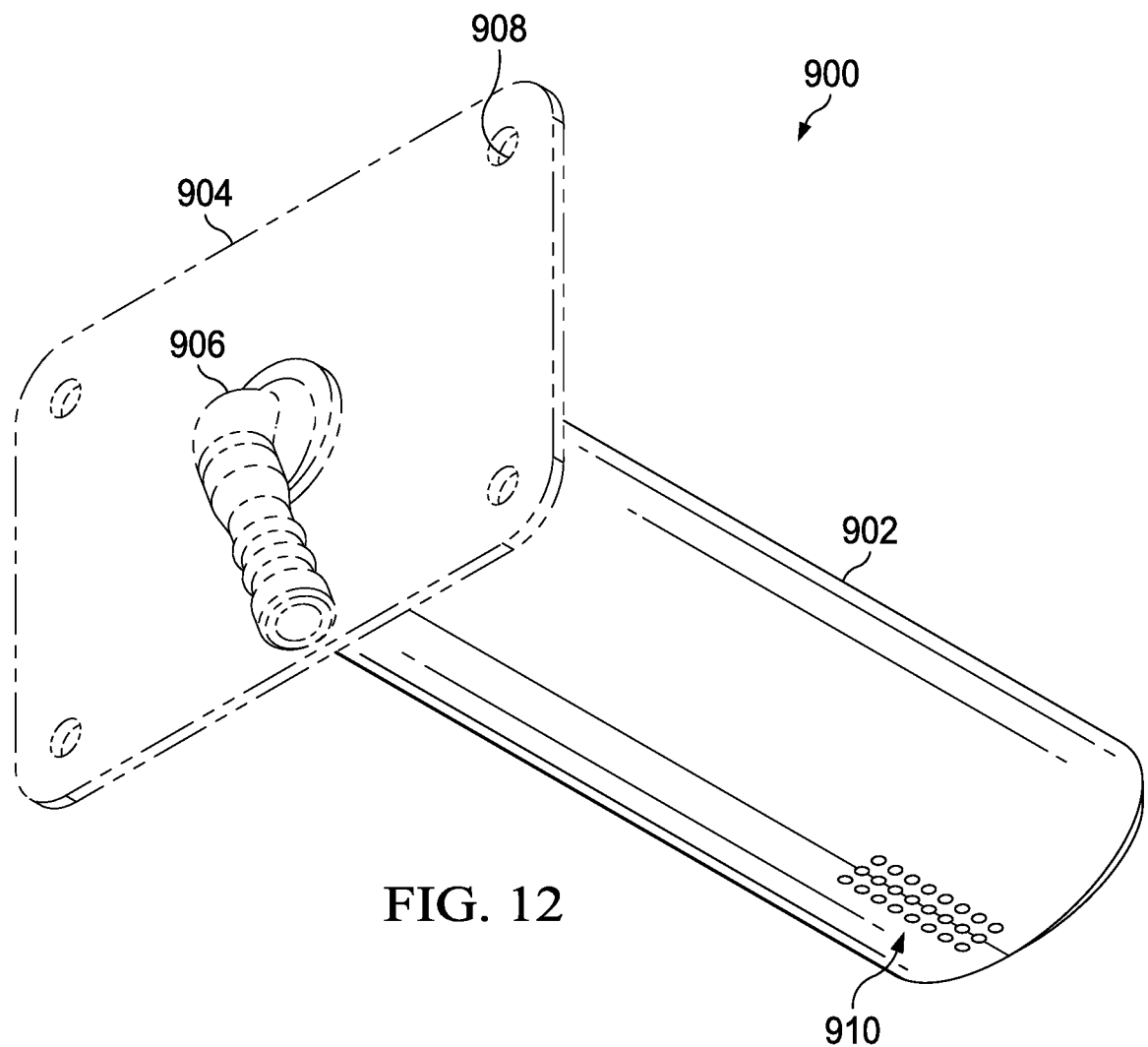
Figure 13:
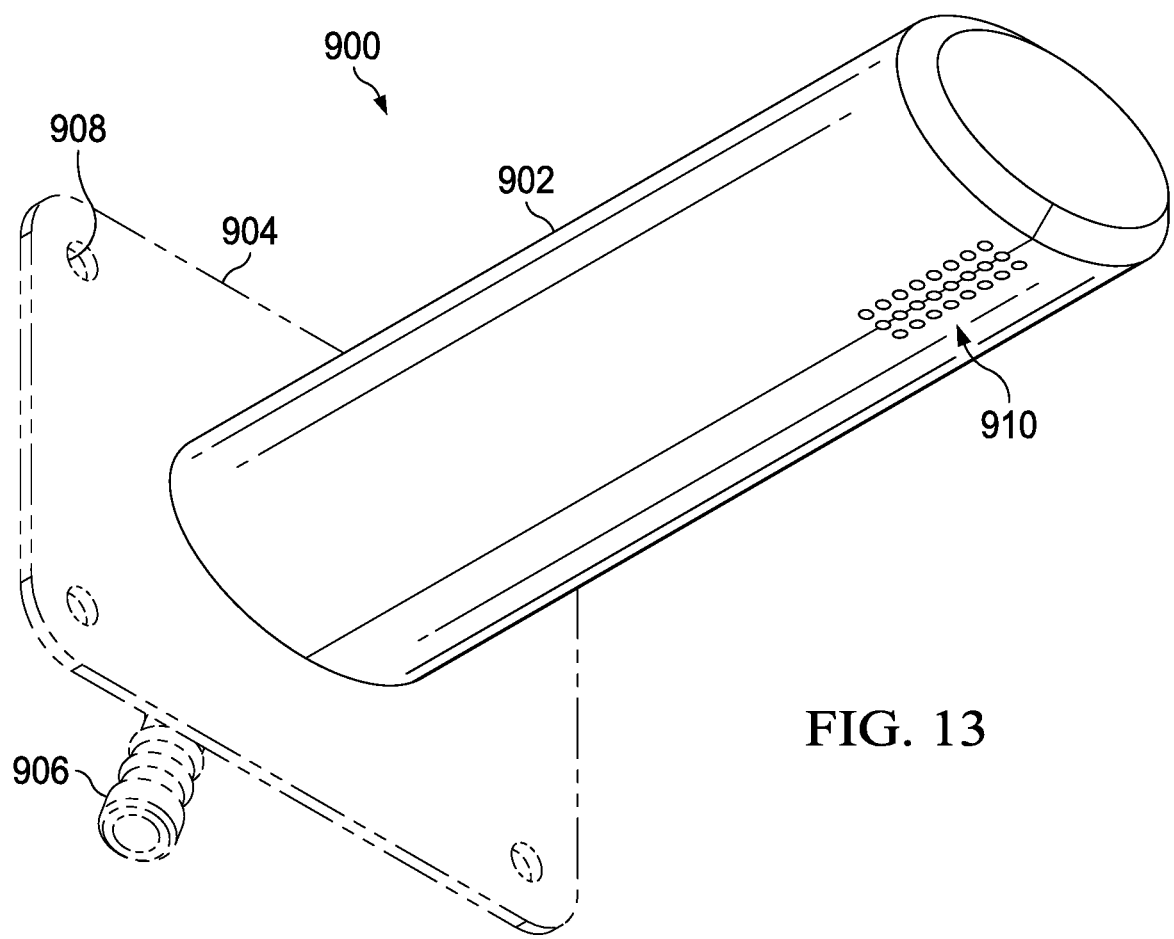
Figure 14:
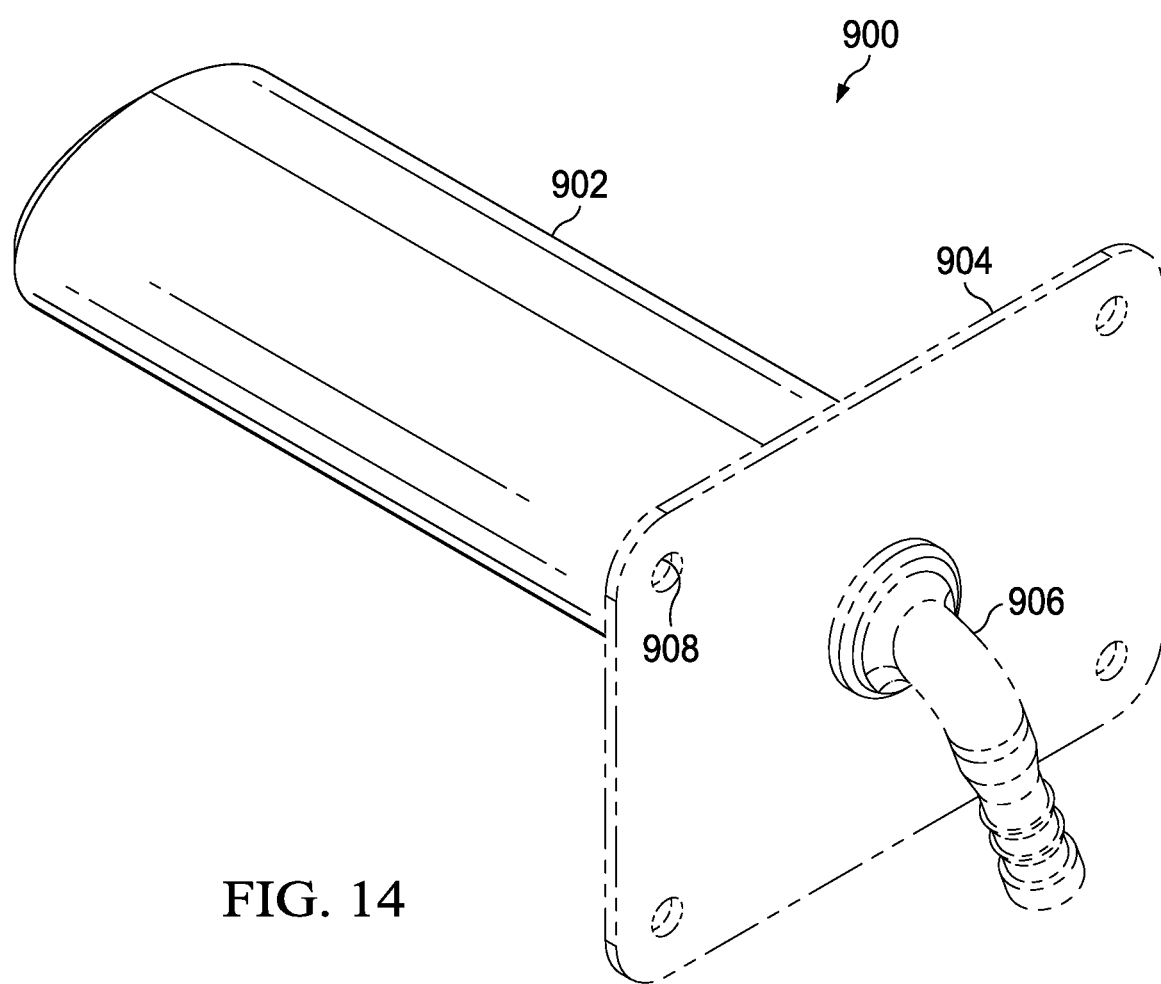

Turning to FIG. 2, an illustration of a block diagram of usage of an actuator including a touchless sensor in multiple applications is depicted in accordance with an illustrative embodiment. Actuator 200 including touchless sensor 202 may be used to control various features in various locations throughout aircraft 204.

For example, actuator 108 in FIG. 1 may be an example one application of actuator 200 to control touchless faucet 206 in lavatory 208 on aircraft 204. Actuator 200 also may be used to control, for example, touchless toilet flush 210, touchless soap dispenser 212, touchless waste flap 214, light features 216, and other features 218 in lavatory 208. Actuator 200 also may be used to control other features 220 on aircraft 204 outside of lavatory 208.

Touchless sensor 202 in actuator 200 has detection range 222. Detection range 222 is the distance from touchless sensor 202 in which a user will be detected by touchless sensor 202. To accommodate use of actuator 200 in various applications, detection range 222 of touchless sensor 202 may be adjustable 224.

Turning to FIGS. 3-8, perspective views of a waterfall faucet outlet are depicted in accordance with an illustrative embodiment. Waterfall faucet outlet 300 is an example of one implementation of faucet outlet 110 in FIG. 1.

Waterfall faucet outlet 300 includes decorative outlet 302, mounting structure 304, and adaptor fitting 306. Decorative outlet 302 may be an example of one implementation of waterfall outlet 170 in FIG. 1. In this example, mounting structure 304 comprises a mounting plate with mounting holes 308 formed therein. In this example, adaptor fitting 306 is a barb fitting. Mounting structure 304 and adaptor fitting 306 are shown in broken lines in FIGS. 6-8.

Turning to FIGS. 9-14, perspective views of a faucet outlet having an oval profile are depicted in accordance with an illustrative embodiment. Faucet outlet 900 is an example of one implementation of faucet outlet 110 in FIG. 1.

Faucet outlet 900 includes decorative outlet 902, mounting structure 904, and adaptor fitting 906. Decorative outlet 902 is an example of one implementation of decorative outlet 162 with oval profile 172 in FIG. 1. In this example, mounting structure 904 comprises a mounting plate with mounting holes 908 formed therein. In this example, adaptor fitting 906 is a barb fitting. Decorative outlet 902 has aerator 910 formed therein. Mounting structure 904 and adaptor fitting 906 are shown in broken lines in FIGS. 12-14.

Figure 15A:
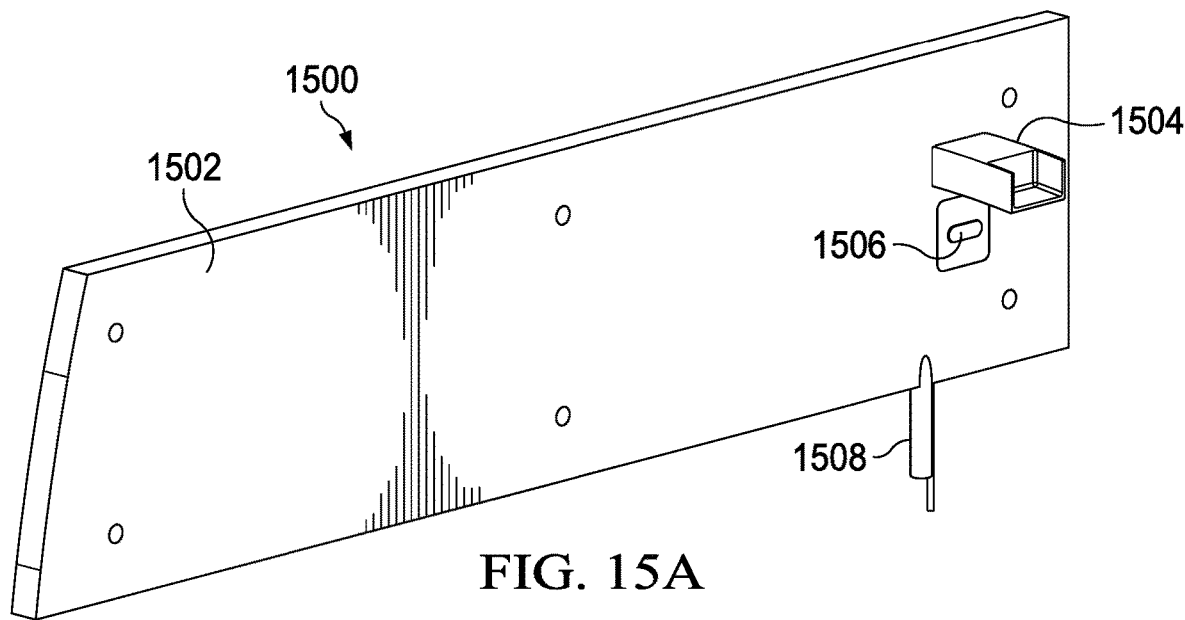
FIG. 15A and FIG. 15B are illustrations of backsplash options for an aircraft modular lavatory monument in accordance with an illustrative embodiment.
Figure 15B:
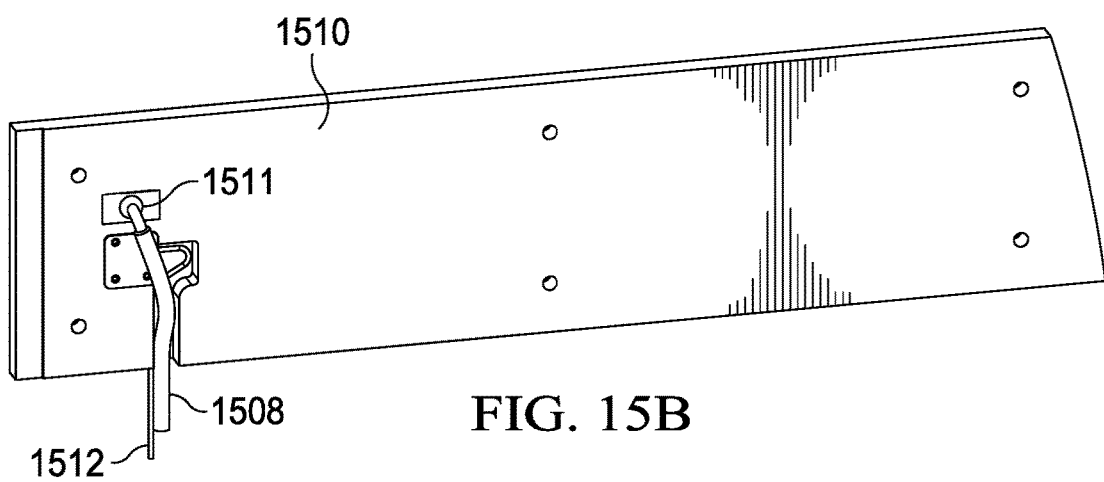

FIG. 15A and FIG. 15B illustrate backsplash options for an aircraft modular lavatory monument in accordance with an illustrative embodiment. Together, FIG. 15A and FIG. 15B may be referred to as "FIG. 15." FIG. 15 illustrates options for backsplash assembly 140 of FIG. 1. For example, backsplash assembly 1500 may be an implementation of backsplash assembly 140 of FIG. 1. Faucet 1504 may be an implementation of modular faucet system 100 of FIG. 1.

Backsplash assembly 1500 includes backsplash sheet 1502, which may be provided in a variety of different styles and colors. Faucet 1504 extends from backsplash sheet 1502. In some illustrative examples, faucet 1504 is removably attached to backsplash sheet 1502. In some illustrative examples, faucet 1504 is attached to a separate component of the lavatory, such as modular shell wall. In these illustrative examples, backsplash sheet 1502 is slid over faucet 1504. In these illustrative examples, backsplash sheet 1502 has an opening through which faucet 1504 extends.

As depicted in FIG. 15A, sensor 1506 is present to actuate faucet 1504. Sensor 1506 is an example of one implementation of touchless sensor 146 in actuator 108 in FIG. 1. In some illustrative examples, sensor 1506 is removably attached to backsplash sheet 1502. In some illustrative examples, sensor 1506 is removably attached to backsplash sheet 1502 independently of faucet 1504. In some illustrative examples, sensor 1506 is attached to a different component of the lavatory, such as a modular shell wall.

Sensor 1506 may be a touchless sensor, or any other desirable sensor, for sensing when a user desires to dispense water from faucet 1504. Sensor 1506 actuates one or more valves for dispensing water, possibly with hot and cold options, through faucet 1504. Water line 1508 provides a conduit for water to faucet 1504. Water line 1508 is an example of one implementation of water line 116 in FIG. 1.

FIG. 15B illustrates back side 1510 of backsplash sheet 1502. Water line 1508 is shown, as is connector 1511 and electrical pigtail 1512 for providing electrical power to sensor 1506.

In this illustrative example, faucet 1504 is removably attached to backsplash sheet. As depicted, sensor 15106 is removably attached to backsplash sheet 1502 independently of faucet 1504.

The illustrative examples shown in FIG. 15 are not meant to imply physical or architectural limitations to the manner in which an illustrative embodiment may be implemented. Other options, styles, and arrangements are also possible.

Figure 16:
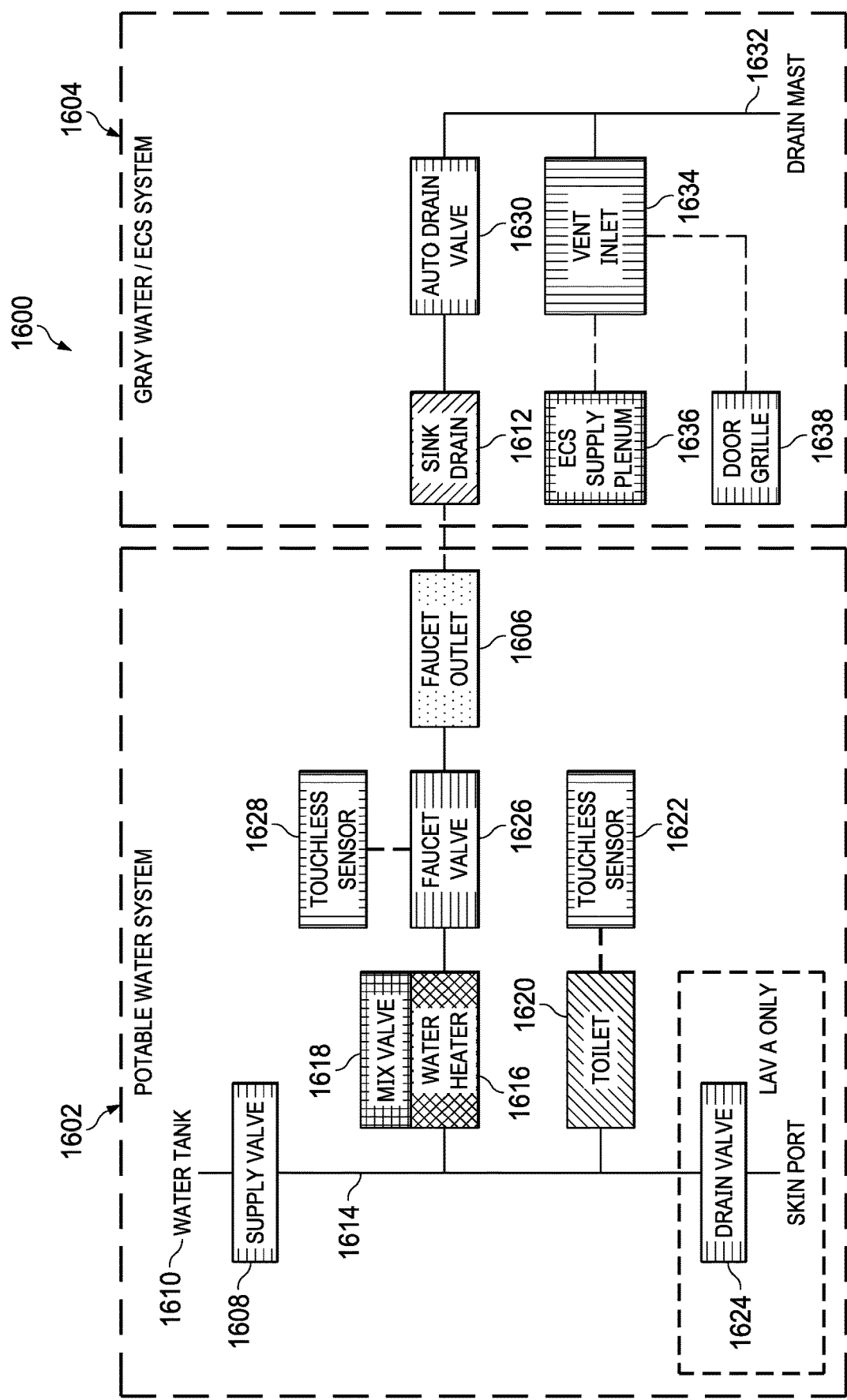
FIG. 16 is an illustration of a block diagram of a water system for an aircraft modular lavatory monument in accordance with an illustrative embodiment.

FIG. 16 illustrates a block diagram of a water system for an aircraft lavatory, in accordance with an illustrative embodiment. Water system 1600 includes various components for controlling the flow of water into and out of an aircraft lavatory, such as lavatory 102 in FIG. 1. Water system 1600 includes various components for controlling the flow of water into and out of the lavatory.

Water system 1600 may have two almost entirely separate sub-systems, specifically potable water system 1602 and gray water system 1604. These two systems do not interact, except that faucet outlet 1606 (drain) of the potable water system 1602 drains into a common water line with sink drain 1612 of the gray water system 1604.

Water system 1600 also includes supply valve 1608, which governs the supply of water from water tank 1610 into water line 1614. Water line 1614 connects to water heater 1616, optionally via mix valve 1618. Water line 1614 also connects to toilet 1620, which is controlled by touchless sensor 1622. Optionally, water line 1614 may connect to drain valve 1624.

Water heater 1616 may connect to faucet valve 1626, which is controlled by touchless sensor 1628. Faucet valve 1626 empties into faucet outlet 1606 into sink drain 1608 of gray water system 1604.

As indicated above, gray water system 1604 includes sink drain 1612. Sink drain 1612 connects to auto drain valve 1630, which in turn empties into drain mast 1632, where waste water is stored for disposal by a ground crew during ground maintenance. Optionally, vent inlet 1634 may also empty into drain mast 1632. Optionally, Environmental Control System (ECS) supply plenum 1636 and door grille 1638 may be connected to vent inlet 1634.

Other options, styles, and arrangements are also possible. The illustrative examples shown in FIG. 16 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 17:
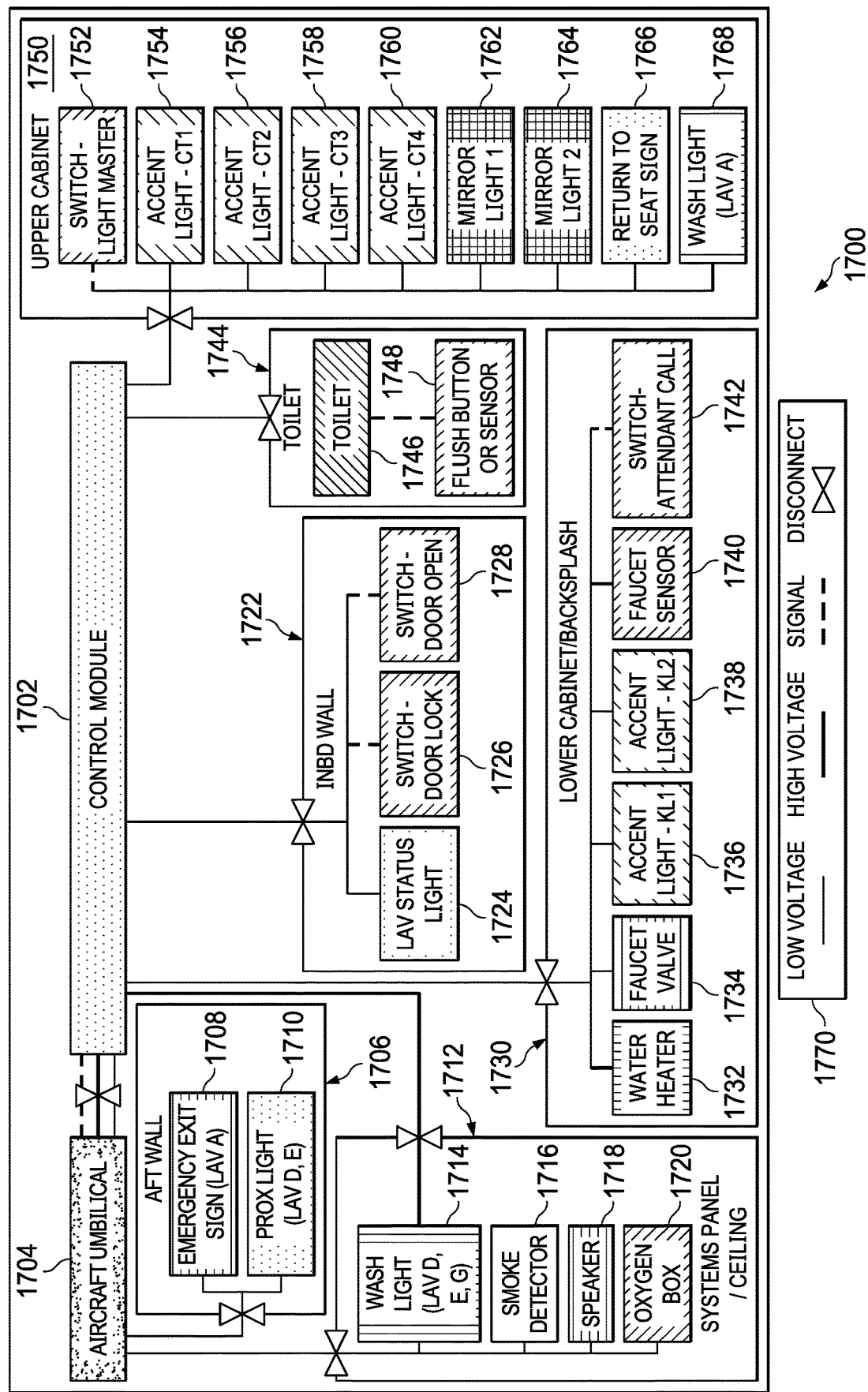
FIG. 17 is an illustration of a block diagram for a control system for an aircraft modular lavatory monument in accordance with an illustrative embodiment.

FIG. 17 illustrates a block diagram for a control system for an aircraft modular lavatory monument, in accordance with an illustrative embodiment. Control system 1700 includes control module 1702, which connects to aircraft umbilical 1704, as well as the sub-components of control system 1700. These sub-components are arranged in groups, as shown, so that each group may be easily replaced as a unit.

For example, aft wall sub-component 1706 is connected to both control module 1702 and aircraft umbilical 1704. Aft wall sub-component 1706 includes emergency exit sign 1708 and possible proximity light 1710.

In another example, system panel/ceiling sub-component 1712 is connected to control module 1702 as well as aircraft umbilical 1704. System panel/ceiling sub-component 1712 includes wash light 1714, smoke detector 1716, speaker 1718, and oxygen box 1720.

In yet another example, inboard wall sub-component 1722 is connected to control module 1702. Inboard wall sub-component 1722 includes lavatory status light 1724, switch-door lock 1726, and switch-door open 1728.

In still another example, lower cabinet/backsplash sub-component 1730 is connected to control module 1702. Lower cabinet/backsplash sub-component 1730 includes water heater 1732, faucet valve 1734, accent light 1736, accent light 1738, faucet sensor 1740 and switch/attendant call button 1742.

In another illustrative embodiment, toilet sub-component 1744 is connected to control module 1702. Toilet sub-component 1744 includes toilet 1746 and flush button or sensor 1748. Thus, via a sensor, toilet 1746 may automatically flush when a user is sensed getting up from the toilet.

In yet another illustrative embodiment, upper cabinet sub-component 1750 may be connected to control module 1702. Upper cabinet sub-component 1750 may include switch-light manager 1752, accent light 1754, accent light 1756, accent light 1758, accent light 1760, mirror light 1762, mirror light 1764, return to seat sign 1766, and wash light 1768.

Legend 1770 is also provided in FIG. 17. The different types of lines and disconnects are thus represented as shown in legend 1770. As used herein, the term "low voltage" refers to less than five volts. The term "high voltage" refers to five volts or greater.

Other options, styles, and arrangements are also possible. Therefore, the illustrative examples shown in FIG. 17 are not meant to imply physical or architectural limitations to the manner in which an illustrative embodiment may be implemented.

Figure 18:
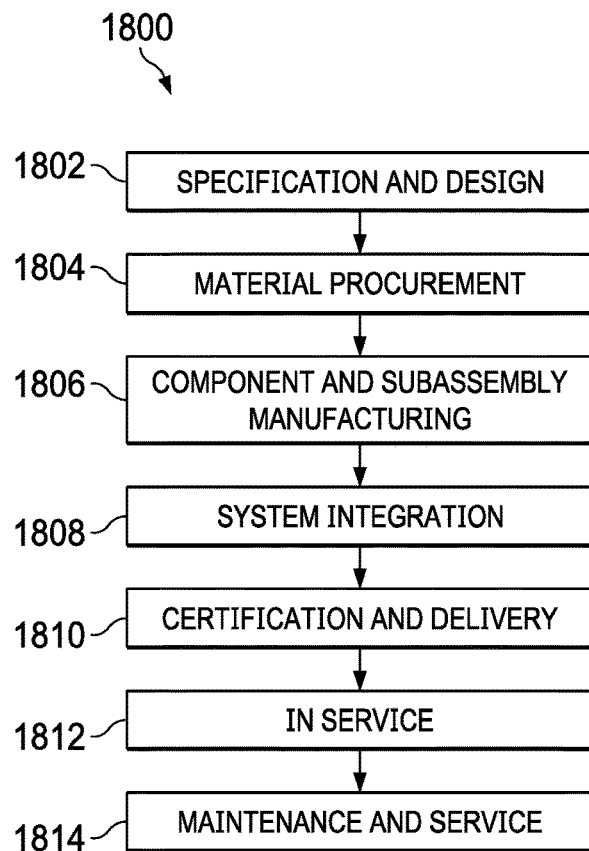
FIG. 18 is an illustration of an aircraft manufacturing and service method in a form of a block diagram in accordance with an illustrative embodiment.
Figure 19:
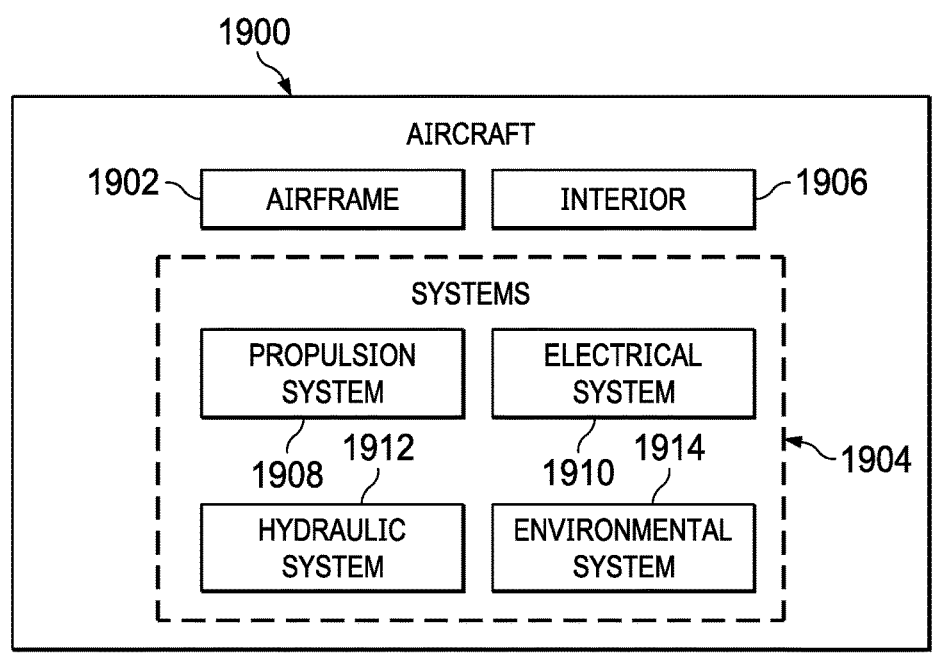
FIG. 19 is an illustration of an aircraft in a form of a block diagram in accordance with an illustrative embodiment.

FIG. 18 is an illustration of an aircraft manufacturing and service method in the form of a block diagram, in accordance with an illustrative embodiment. FIG. 19 is an illustration of an aircraft in the form of a block diagram, in accordance with an illustrative embodiment.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During preproduction, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. One or more apparatus embodiments, method embodiments, or a combination thereof may be utilized during production stages, such as component and subassembly manufacturing 1806 and system integration 1808 in FIG. 18.

One or more apparatus embodiments, method embodiments, or a combination thereof may be utilized while aircraft 1900 is in service 1812 and/or during maintenance and service 1814 in FIG. 18. The use of a number of the different illustrative embodiments may substantially expedite the assembly of and/or reduce the cost of aircraft 1900.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A modular faucet system for an aircraft, such that the modular faucet system comprises:
   a faucet outlet, devoid of a flow valve control and a temperature control, configured to be secured to a first structure on the aircraft;
   a flow valve configured to:
      be secured to a second structure of the aircraft separately from the faucet outlet; and
      be controlled by an actuator:
         configured to be secured on the aircraft separately from the faucet outlet and the flow valve;
         that comprises a touchless sensor configured to generate a control signal to open the flow valve to provide water to the faucet outlet.

2. The modular faucet system of claim 1, wherein:
   more testing and qualification is required for using the flow valve and the actuator on the aircraft relative to the faucet outlet, wherein the flow valve and the actuator that satisfy the more testing and qualification required are certified for use on the aircraft; and
   less testing and qualification is required for using the faucet outlet on the aircraft relative to the flow valve and the actuator.

3. The modular faucet system of claim 1, wherein the faucet outlet is selected from a plurality of different faucet outlets that are configured for use with the flow valve and the actuator on the aircraft.

4. The modular faucet system of claim 1, wherein the faucet outlet comprises:
   a decorative outlet that is visible when the faucet outlet is installed on the aircraft;
   a mounting structure configured to attach the decorative outlet to a support structure on the aircraft; and
   an adapter fitting configured to connect the decorative outlet in fluid communication with the flow valve.

5. The modular faucet system of claim 4, wherein the decorative outlet is selected from one of a waterfall outlet and an outlet having an oval profile.

6. The modular faucet system of claim 1, wherein the flow valve comprises an adjustable mix valve that is configured to mix hot water with cold water to provide mixed warm water to the faucet outlet.

7. The modular faucet system of claim 1, wherein the touchless sensor is an infrared sensor.

8. The modular faucet system of claim 1, wherein the actuator further comprises a manual push button and wherein the actuator is configured to generate the control signal to open the flow valve to provide the water from water supply on the aircraft to the faucet outlet in response to an actuation of the manual push button.

9. The modular faucet system of claim 1, wherein the touchless sensor comprises an adjustable detection range.

10. The modular faucet system of claim 1, wherein:
    the faucet outlet comprises a mounting structure having mounting holes therein; and
    the faucet outlet is mounted on a support structure by fasteners extending through mounting holes into a back side of the support structure.

11. A method of installing a modular faucet system on an aircraft, comprising:
    securing a faucet outlet, devoid of a flow valve control and a temperature control to a first structure on the aircraft;
    securing a flow valve to a second structure on the aircraft separately from securing the faucet outlet on the aircraft;
    connecting the flow valve to a water supply on the aircraft;
    connecting the flow valve to the faucet outlet; and
    installing an actuator comprising a touchless sensor on the aircraft separately from installing the faucet outlet and the flow valve on the aircraft, wherein the actuator is configured to generate a control signal to open the flow valve to provide water from the water supply to the faucet outlet.

12. The method of claim 11, wherein:
more testing and qualification is required for installing the flow valve and the actuator on the aircraft relative to the faucet outlet, wherein the flow valve and the actuator that satisfy the more testing and qualification required are certified for use on the aircraft; and
less testing and qualification is required for installing the faucet outlet on the aircraft relative to the flow valve and the actuator.

13. The method of claim 11 further comprising selecting the faucet outlet from a plurality of different faucet outlets that are configured for use with the flow valve and the actuator on the aircraft.

14. The method of claim 11, wherein the faucet outlet comprises:
a decorative outlet that is visible when the faucet outlet is installed on the aircraft;
a mounting structure configured to attach the decorative outlet to a support structure on the aircraft; and
an adapter fitting configured to connect the decorative outlet in fluid communication with the flow valve.

15. The method of claim 14, wherein the decorative outlet is selected from one of a waterfall outlet and an outlet having an oval profile.

16. The method of claim 11, wherein the flow valve comprises an adjustable mix valve that is configured to mix hot water with cold water to provide mixed warm water to the faucet outlet.

17. The method of claim 11, wherein the touchless sensor is an infrared sensor.

18. The method of claim 11, wherein the actuator further comprises a manual push button and wherein the actuator is configured to generate the control signal to open the flow valve to provide the water from the water supply to the faucet outlet in response to an actuation of the manual push button.

19. The method of claim 11, wherein installing the faucet outlet on the aircraft and installing the actuator on the aircraft comprises:
installing the faucet outlet on a backsplash assembly;
installing the actuator on the backsplash assembly; and
installing the backsplash assembly in a modular lavatory monument after installing the faucet outlet and the actuator on the backsplash assembly.

20. A method of installing a modular faucet system on an aircraft, comprising:
removing one of: a faucet outlet devoid of a flow valve control and a temperature control, a flow valve, and an actuator from a lavatory on the aircraft without removing an other of the faucet outlet devoid of the flow valve control and the temperature control, the flow valve, and the actuator from the lavatory, wherein the faucet outlet devoid of the flow valve control and the temperature control, the flow valve, and the actuator are separate components of the modular faucet system, wherein the flow valve is configured to be installed on the aircraft separately from the faucet outlet devoid of the flow valve control and the temperature control, wherein the actuator is configured to be installed on the aircraft separately from the faucet outlet devoid of the flow valve control and the temperature control and the flow valve, wherein the flow valve is connected to a water supply on the aircraft, and wherein the actuator comprises a touchless sensor for generating a control signal to open the flow valve to provide water from the water supply to the faucet outlet devoid of devoid of the flow valve control and the temperature control; and
replacing the one of the faucet outlet devoid of the flow valve control and the temperature control, the flow valve, and the actuator removed from the lavatory without replacing an other of the faucet outlet devoid of the flow valve control and the temperature control, the flow valve, and the actuator.

\* \* \* \* \*